US005707309A

United States Patent [19]

Simpson

[11] Patent Number: 5,707,309
[45] Date of Patent: Jan. 13, 1998

[54] HYDRAULIC TENSIONER WITH MODULAR INLET CHECK VALVE WITH PRESSURE RELIEF

[75] Inventor: Roger T. Simpson, Ithaca, N.Y.

[73] Assignee: Borg-Warner Automotive, Inc., Sterling Heights, Mich.

[21] Appl. No.: 788,039

[22] Filed: Jan. 23, 1997

[51] Int. Cl.⁶ ...................................................... F16H 7/08
[52] U.S. Cl. ............................................ 474/110; 474/135
[58] Field of Search ................................. 474/110, 111, 474/135, 138

[56] References Cited

U.S. PATENT DOCUMENTS

| 4,507,103 | 3/1985 | Mittermeier | 474/110 |
|---|---|---|---|
| 4,539,001 | 9/1985 | Okabe | 474/110 |
| 4,708,696 | 11/1987 | Kimura et al. | 474/103 |
| 4,826,470 | 5/1989 | Breon et al. | 474/110 |
| 4,850,941 | 7/1989 | Sosson | 474/110 |
| 4,881,927 | 11/1989 | Suzuki | 474/110 |
| 5,037,357 | 8/1991 | Ojima | 474/111 |
| 5,117,786 | 6/1992 | Trzmiel et al. | 123/90.31 |
| 5,167,402 | 12/1992 | Nakakubo et al. | 267/226 |
| 5,181,889 | 1/1993 | Maruyama et al. | 474/110 |
| 5,259,820 | 11/1993 | Mott | 474/110 |
| 5,277,664 | 1/1994 | Mott | 474/110 |
| 5,310,385 | 5/1994 | Suzuki | 474/110 |
| 5,314,388 | 5/1994 | Suzuki et al. | 474/110 |
| 5,346,436 | 9/1994 | Hunter et al. | 474/110 |
| 5,366,415 | 11/1994 | Church et al. | 474/110 |
| 5,370,584 | 12/1994 | Todd | 474/110 |
| 5,383,813 | 1/1995 | Odai | 474/110 |

Primary Examiner—Roger J. Schoeppel
Attorney, Agent, or Firm—Sidley & Austin; Greg Dziegielewski, Esq.

[57] ABSTRACT

A hydraulic tensioner for a wrapped power transmission device designed to minimize the amount of air present in the pressure chamber. The hydraulic tensioner includes a combination pressure relief-check valve for use with a hollow piston pressure chamber containing a spring within the pressure chamber to bias the piston outward from the bore. The valve housing is designed to reduce the volume of fluid contained within the pressure chamber minimizing the amount of air which may become trapped in the pressure chamber thus improving the performance of the tensioner.

19 Claims, 6 Drawing Sheets

HYDRAULIC TENSIONER WITH MODULAR INLET CHECK VALVE WITH PRESSURE RELIEF

Reference is made to pending application Ser. No. 08/516,919, filed Aug. 18, 1995, entitled "Integral Inlet and Pressure Relief Valve for an Automotive Tensioner," the subject matter of which relates to the present invention.

BACKGROUND OF THE INVENTION

A tensioning device, such as a hydraulic tensioner, is used as a control device for a power transmission chain, or similar power transmission device, as the chain travels between a plurality of sprockets. In these devices, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain.

Prevention of such slippage is particularly important in the case of a chain driven camshaft in an internal combustion engine because jumping of teeth will throw off the camshaft timing, possibly causing damage or rendering the engine inoperative. However, in the harsh environment of an internal combustion engine, various factors can cause fluctuations in the chain tension.

Wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations may cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Hydraulic tensioners are a common method of maintaining proper chain tension. In general, these mechanisms employ a lever arm that pushes against the chain on the slack side of the power transmission system. This lever arm must push toward the chain, tightening the chain, when the chain is slack, and must retract away from the chain when the chain tightens.

To accomplish this result, a hydraulic tensioner typically comprises a rod or cylinder as a plunger, which is biased in the direction of the chain by a tensioner spring. The plunger is housed within a cylindrical plunger housing, having an interior space which is open at the end facing the chain and closed at the other end. The interior space of the plunger housing contains a pressure chamber in connection with a reservoir or exterior source of hydraulic fluid. The pressure chamber is typically formed between the plunger housing and the plunger, and it expands or contracts when the plunger moves within the plunger housing.

Typically, two types of valves are employed to regulate the flow of fluid into and out of the pressure chamber: inlet check valves and pressure relief valves. The inlet check valve typically includes a ball-check valve that opens to permit fluid flow out when the pressure inside the chamber has decreased as a result of outward movement of the plunger. When the pressure in the pressure chamber is high, the inlet check valve closes, preventing fluid from exiting the pressure chamber, which in turn prevents the piston chamber from contracting, which in turn prevents the piston from retracting, achieving a so-called "no-return" function.

The pressure relief valve allows the tensioner to retract in response to large increases in chain tension. The pressure relief valve typically includes a spring biased check valve. This valve opens when the pressure in the pressure chamber becomes too high and exceeds a predetermined maximum level. The pressure relief valve's opening allows fluid to exit the pressure chamber, which allows the pressure chamber to contact, which allows the plunger to retract.

In operation, the tensioner spring and hydraulic fluid urge the piston outwards, balanced against the inward force of the chain. As the tension in the chain increases, the chain exerts a force on the plunger in the direction of plunger retraction. As the plunger is forced in the retraction direction, the fluid pressure in the pressure chamber increases, but the inlet check valve prevents the fluid from exiting the pressure chamber. If the pressure exceeds a predetermined maximum level, the pressure relief valve opens, allowing the fluid to exit the pressure chamber.

If, due to chain wear or other factors, the tension in the chain reduces so that the force of the chain on the plunger no longer balances the combined force of the hydraulic pressure and the tensioner spring, then the plunger will extend toward the chain, thereby tensioning the chain. As the plunger extends toward the chain, the inlet valve opens, allowing hydraulic oil from the external source of oil to fill the pressure chamber.

The design of these hydraulic tensioners face a number of problems. One problem is the possibility of air being trapped with oil the pressure chamber. Because air is compressible, even a small quantity of air in the pressure chamber allows the plunger to retract a small distance, and reduces the force provided by the hydraulic fluid. As a result, the plunger may fail to tension the chain as intended.

Air in the pressure chamber is a particular problem during engine start-up. After the engine has been turned off, the air separates from the oil in the pressure chamber, and rises to the highest portion of the chamber. This can lead to a particularly unresponsive tensioner and excessive noise during engine start-up.

One example of a device designed to minimize the presence of air in the pressure chamber is described in Kimura et al., U.S. Pat. No. 4,708,696. Kimura, et. al. employ various mechanisms for minimizing air in the hydraulic fluid chambers, including placement of elastomeric elements or an expandable accordion-like bellows in the pressure chamber. When the pressure chamber expands corresponding to extension of the plunger, these devices expand to reduce the required increase in volume of fluid in the pressure chamber, thus reducing the likelihood that air will enter the chambers. Unfortunately, these elements may not retain their elasticity during extended use in the hostile environment of the internal combustion engine.

Other devices have attempted to minimize air in the pressure chamber by providing a path for the air to escape. Suzuki et al., U.S. Pat. No. 5,314,388, discloses a hydraulic tensioner with an air bleeding mechanism. In this device, an air vent containing a ball check valve is positioned in the ceiling of the pressure chamber. During operation of the engine, the oscillations and vibrations of the engine cause the fluid-air mixture in the pressure chamber to oscillate. If air bubbles are present in the pressure chamber, these oscillations will allow the air to pass through the check valve and out of the pressure chamber through the air vent. The disadvantages of this system include the possibilities that not all of the air will exit through the ball check valve, that hydraulic fluid may be lost through the check valve, and that some air may even enter the pressure chamber from the exterior and through the check valve.

Similarly, other attempts have been made to provide a path through which air in the pressure chamber may exit the pressure chamber. Breon et al., U.S. Pat. No. 4,826,470 disclose a hydraulic tensioner having at least one air vent, so that air may exit the chamber when the tensioner is rotated during operation. Nakakubo et al., U.S. Pat. No. 5,167,402, and Church et al., U.S. Pat. No. 5,366,415, disclose hydraulic tensioners having radial grooves on the plunger wall leading to a restricted clearance, so that air bubbles may travel down the grooves and exit the pressure chamber through the clearance.

The disadvantages of these devices include the possibility that the air will not follow the designated path out of the pressure chamber, and consequently the air will continue to impede the operation of the tensioner. Moreover, many of these device rely on the vibrations and oscillations of the operating engine to urge the air along the exit paths. Consequently, these devices are ineffective in preventing the presence of air in the pressure chamber during engine start-up.

A better tensioner design is one that minimizes the likelihood of the initial introduction of air into the pressure chamber. A structure is located within the pressure chamber which displaces fluid while not interfering with the piston action. The volume occupied by the structure reduces the volume of the high pressure chamber, and thus reduces the volume of air that can become trapped in the high pressure chamber. The resulting reduction in air improves the performance of the tensioner at start up and while the engine is running.

The concept of reducing the volume of the high pressure chamber has been used in other conventional tensioning devices. These devices use a plastic solid rod assembled within the piston tensioner spring. This rod displaces the oil in the center of the spring. Such a device is difficult to assemble due to the danger of the rod interfering with the tensioner spring. Moreover, the piston housing of such a device must include an inlet to the source of pressurized fluid, an inlet check valve, a pressure relief valve, an air vent, and a means for reliably securing the plastic rod to the housing. These requirements make the housing expensive to manufacture and difficult to assemble.

In contrast, the present invention incorporates a valve housing assembled within the piston tensioning spring. This valve housing comprises a hollow structure, such as a cylinder, which houses the inlet valve and pressure relief valves and serves as a conduit for fluid to pass either in to or out of the pressure chamber. In one embodiment, an integral inlet and pressure relief valve serves the functions of both an inlet check valve and a pressure relief valve.

The piston housing has an aperture connected to the external source of pressurized fluid, and the valve housing is sealed over this aperture. During piston retraction or extension, fluid in the pressure chamber must enter or exit the pressure chamber through the valve housing, regulated by the inlet and pressure relief valves.

The advantages of the present invention include the use of volumetric reduction to minimize the introduction of air into the pressure chamber. Additionally, by combining the inlet check valve, pressure relief valve, and inlet within the volume reducing structure, the present invention is easier to manufacture and assemble.

The combination of the inlet valve and pressure relief valve into an integral inlet and pressure relief valve has the additional advantage that high pressure fluid which exits the fluid chamber through the pressure relief valve is vented to the external source of fluid, rather than vented to the interior of the engine. As a result, fluid is utilized more efficiently.

Accordingly, it is an object of the invention to provide a hydraulic tensioner capable of improved response to fluctuations in chain tension. Another object of this invention is to provide a hydraulic tensioner which allows a minimum of air inside the pressure chamber, particularly during engine start up. Another object of this invention is to provide a hydraulic tensioner having both inlet check and pressure relief functions performed within single housing. A further object of this invention is to provide a hydraulic tensioner allowing for ease of manufacture and assembly.

SUMMARY OF THE INVENTION

According to one aspect of the present invention, there is provided a tensioner for a wrapped power transmission device, e.g. a chain connecting at least two rotating members such as a pair of sprockets. A piston slidably fits within a bore in a piston housing, forming a pressure chamber. A spring is contained within the pressure chamber biasing the piston outward from the bore.

The present invention concerns a tensioner design for minimizing the amount of air present in the pressure chamber. The pressure chamber is filled with pressurized fluid, with an outlet at the end of the bore leading to an external source pressurized fluid. A valve housing is positioned within the piston spring. This valve housing is a hollow structure, positioned against the portion of the piston housing surrounding the outlet leading to the external source of pressurized fluid. The volume occupied by the valve housing has the effect of displacing fluid from the pressure chamber, thus reducing the volume of the pressure chamber. This reduced volume has the effect of minimizing the amount of air present in the pressure chamber, improving the performance of the tensioner.

Inside the valve housing are assembled valves regulating the flow of fluid in to and out of the pressure chamber. Preferably, an integral inlet and pressure relief valve is employed. This valve has the effect of permitting fluid to flow in to the pressure chamber, but to only permit fluid to exit the pressure chamber when the pressure in the pressure chamber reaches a certain specified limit. This regulation of the fluid flow provides for a tensioner responsive to fluctuations in chain tension, and the use of a single valve housing provides advantages of assembly and manufacture.

For a better understanding of these and other aspects and objects of the invention, reference should be made to the following detailed description taken in conjunction with the accompanying drawings.

BRIEF DESCRIPTION OF THE DRAWINGS

In the drawings, which are not to scale.

DETAILED DESCRIPTION OF THE PREFERRED EMBODIMENTS

Turning now to the drawings, the present invention is directed to providing a hydraulic tensioner utilizing volumetric reduction of the pressurized piston chamber. The tensioner includes a volume occupying structure inside the pressure chamber which serves as a conduit for the pressurized fluid and which houses the valves regulating the flow into and out of the pressurized chamber. The use of volumetric reduction improves the responsiveness of the tensioner, and the use of a valve housing to reduce the volume allows for ease of manufacturing and assembly.

Figure 1:
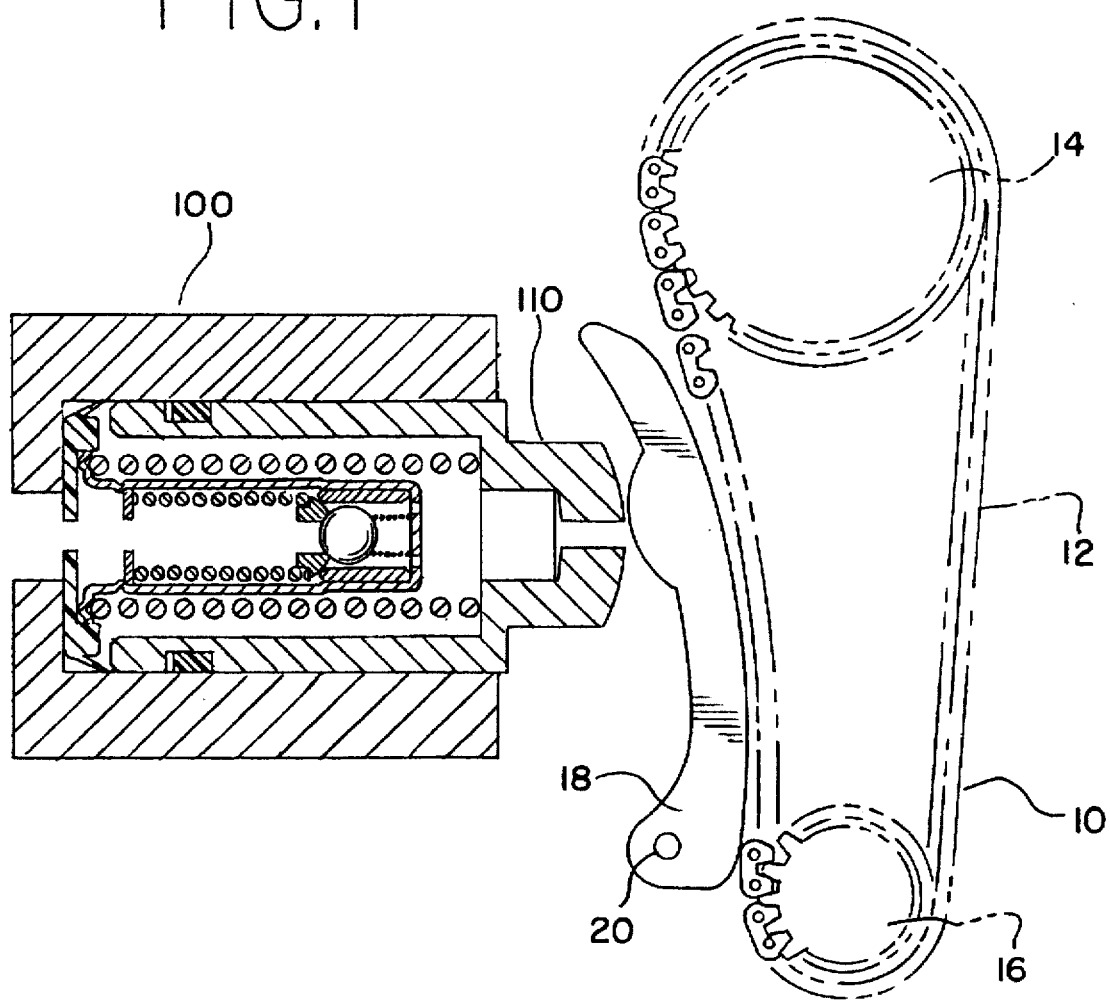
FIG. 1 is a side view of one embodiment of the present invention, a power transmission device operating with a hydraulic tensioner.

FIG. 1 illustrates one embodiment of the present invention. A power transmission device 10 comprises a chain 12 operating between two sprockets 14, 16. A lever arm 18 mounted on a pivot 20 presses against the chain to maintain tension. A hydraulic tensioner 100 has a plunger 110, which applies force to the lever arm 18.

Figure 2:
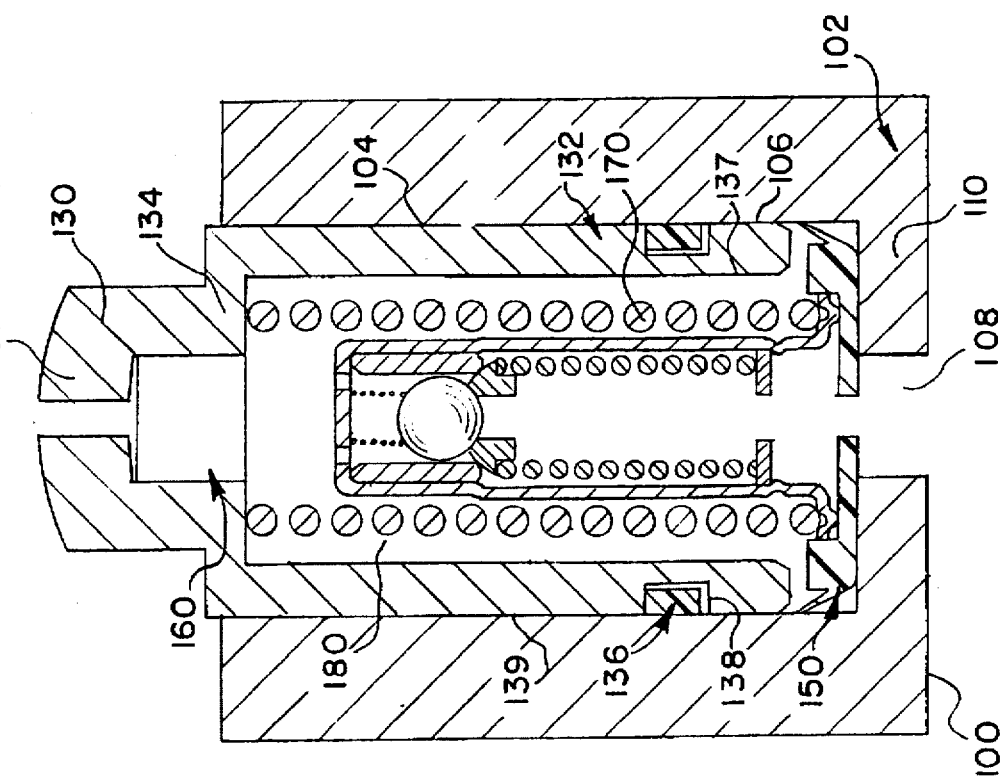
FIG. 2 is a side view of one embodiment of the tensioner of the present invention, with plunger retracted.

FIG. 2 is a side view of one of the embodiments of the present invention. The tensioner 100 includes a piston housing 102 having a cylindrical bore 104 and an inner circumferential surface 106 on this bore. The piston housing has an aperture 108 at the closed end 110 of the bore. This aperture connects to a reservoir or an external supply of pressurized fluid (not shown).

A cylindrical piston 130 is slidably assembled within the piston bore 104. This piston comprises a cylindrical body 132 with a closed end 134. In some embodiments, this closed end 134 may have a vent tube 160 which drains air and some fluid from the piston housing 102.

In some embodiments, a seal ring 136 is housed in a groove 138 on the outer circumferential surface 139 of the piston. This seal ring 136 forms a seal between the piston outer circumferential surface 139 and the inner circumferential surface 106 of the piston housing bore 104. In other embodiments, the seal ring may be housed on the inner circumferential surface 106 of the piston housing bore 104.

Assembled concentrically within the piston 130 is the piston spring 170. The piston spring 170 biases the piston 130 out of the piston housing 102 so that the piston tip 131 pushes against the lever arm 18 as shown is FIG. 1.

Assembled within the piston spring 170 is the valve housing 200. This is a structure whose volume displaces a large portion of the fluid within the piston spring. In one embodiment, the valve housing is roughly cylindrical, but other shapes could also be employed. For instance, in the preferred embodiment, shown in FIGS. 5 and 6, the valve housing comprises two cylindrical body portions 610, 620 having different radii, and which are separated by a shoulder 615. In the preferred embodiment, the valve housing contains both the inlet check valve and the pressure relief valve.

The valve housing comprises a roughly cylindrical body, with a closed end 210 and an open end 212. In some embodiments, such as the embodiment shown in FIGS. 3 and 4, the closed end 210 has an aperture 216 through which fluid may flow. In the preferred embodiment, shown in FIGS. 5 and 6, a plurality of apertures 216 are provided on the cylindrical body portion 610 substantially adjacent the closed end 210. The open end 212 is sealed against the closed end 110 of the piston bore 104. In one embodiment, a seal plug 150 is seated between the open end of the valve housing and the closed end 110 of the piston bore, and forms a seal between those two surfaces. In the preferred embodiment, the open end 212 of the valve housing 200 has a radial flange 214. This flange 214 seats against the seal plug 150. The flange 214 also seats against the piston spring 170.

Thus, a high pressure fluid chamber 180 is formed within the piston housing 102. The high pressure fluid chamber 180 is annular in shape. Its outer circumferential surface is formed by the inner circumferential surface 137 of the piston and the inner circumferential surface 106 of the piston housing bore 104. The seal ring 136 prevents fluid from escaping the high pressure fluid chamber through the space between the piston 130 and the piston housing 102. The top of the high pressure fluid chamber is formed by the closed end 134 of the piston. The inner circumferential surface of the high pressure fluid chamber 180 is formed by the outer circumferential surface 139 of the piston. The bottom of the high pressure fluid chamber is formed by seal plug 150.

Assembled within the valve housing are the valves which regulate fluid flow in to and out of the high pressure fluid chamber 180. In the preferred embodiment, an integral inlet and pressure relief valve 300 is employed. This valve serves the dual purpose of an inlet check valve, which allow pressurized fluid to enter the high pressure fluid chamber but does not allow fluid to exit the high pressure fluid chamber, and a pressure relief valve, which does permit fluid to exit the high pressure fluid chamber, but only to provide pressure relief when the pressure of the fluid reaches a certain specified level. In addition, the valve has the additional feature that fluid passing through the pressure relief valve is vented to the external source of fluid, allowing for the efficient re-use of that fluid.

The integral inlet and pressure relief valve comprises a number of components. A spring retainer washer 310 is assembled within the valve housing 200 such that its axial position with respect to the valve housing is fixed. A pressure relief spring 312 is mounted on the spring retainer washer 310 concentric with the valve housing 200. An annular pressure relief disk 314 is positioned concentrically within the valve housing at the end of the pressure relief spring 312 opposite the spring retainer washer 310. In this way, the pressure relief spring 312, braced against the fixed spring retainer washer 310, biases the pressure relief disk 314 in the direction of the closed end 210 of the valve body 200. When pressure in the high pressure fluid chamber exceeds a predetermined maximum level, the disk 314 moves away from the closed end of the valve to release pressure, as shown by the arrows in FIG. 6. The pressure relief disk has an outside diameter 315 and an inside diameter 316.

Figure 3:
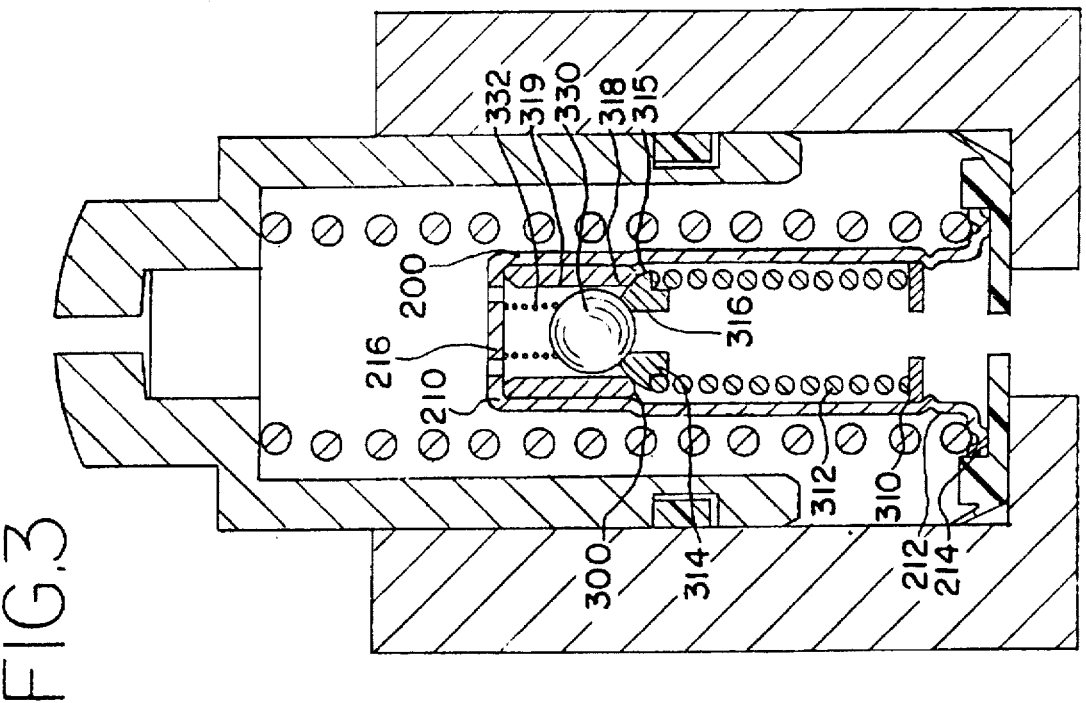
FIG. 3 is a side view of the tensioner shown in FIG. 2, with plunger extended.
Figure 5:
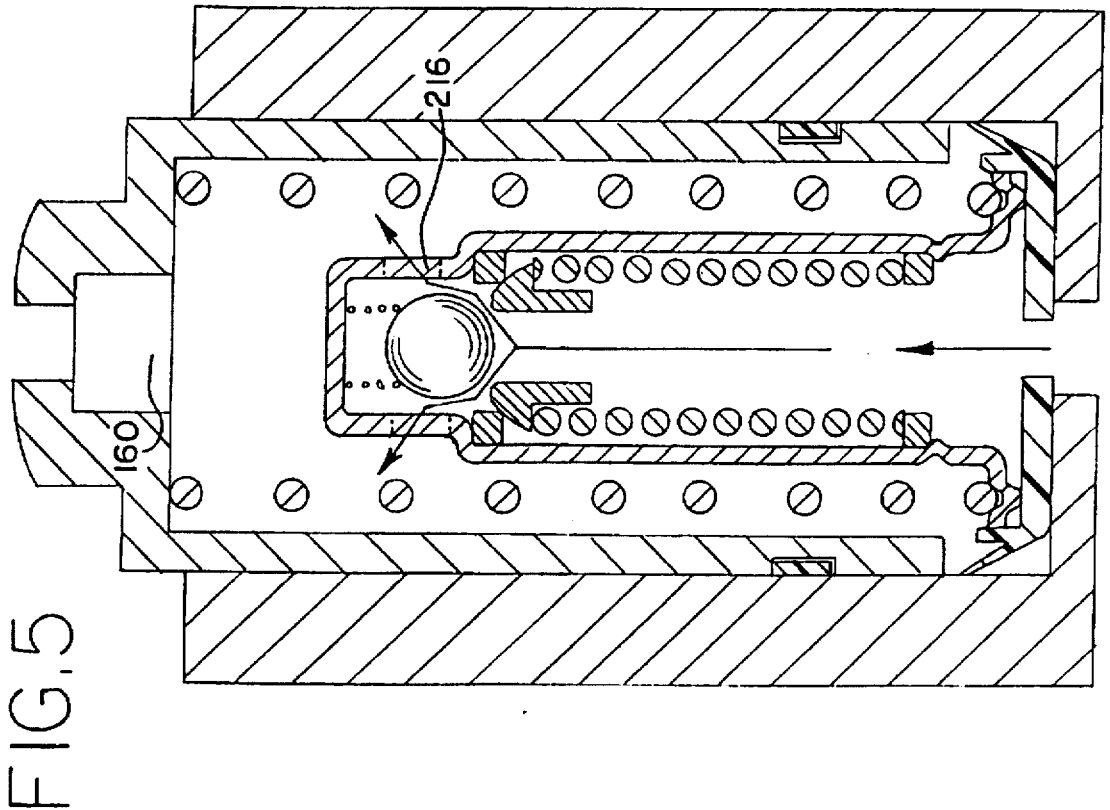
FIG. 5 is a side view of another embodiment of the present invention, with the inlet check portion of the integral inlet and pressure relief valve open.
Figure 6:
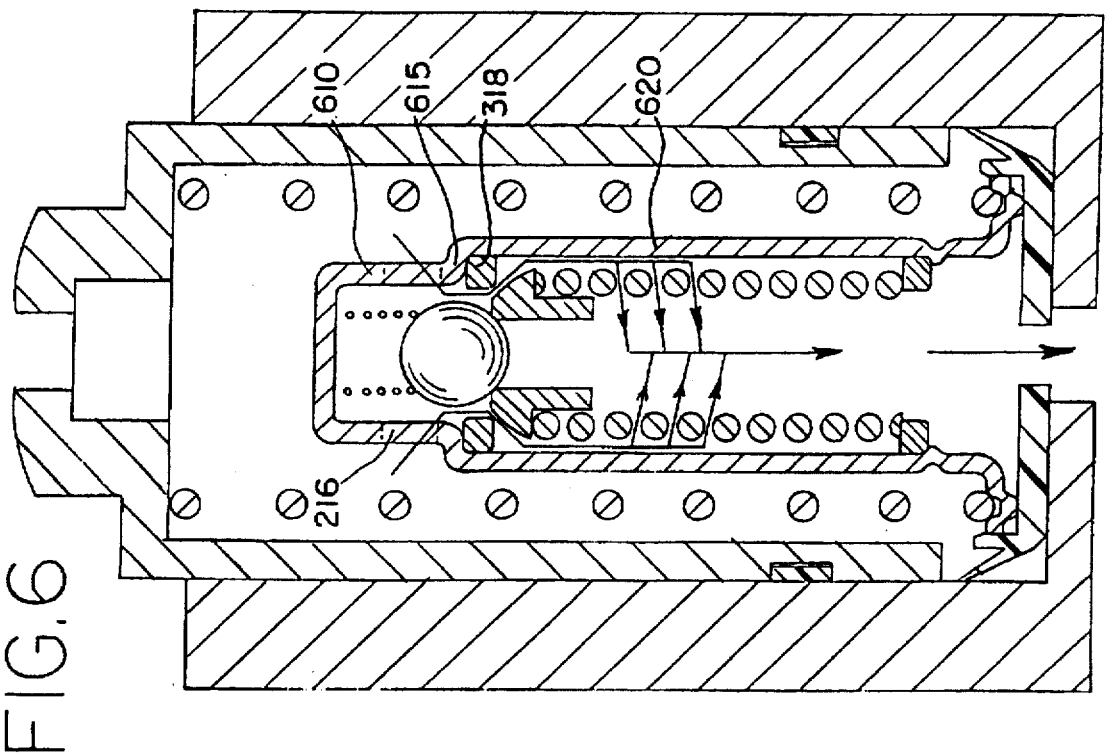
FIG. 6 is a side view of the tensioner shown in FIG. 5, with the pressure relief portion of the integral inlet and pressure relief valve open.

Biased toward the closed end 210 of the valve housing 200, the pressure relief disk 314 seats against a pressure relief seat 318. In one embodiment, as shown in FIGS. 2 and 3, this pressure relief seat 318 is a cylindrical body braced against the closed end 210 of the valve housing 200, having an inside diameter 319 less than the outside diameter 315 of the pressure relief disk 314. In the preferred embodiment, as shown in FIGS. 5 and 6, the pressure relief seat 318 is an annular member seated against the valve housing shoulder 615. However, the pressure relief seat may be any component fixed with respect to the valve housing 200 and capable of forming a seal with the pressure relief disk 314.

A valve member 330 also seats against the pressure relief disk. In one preferred embodiment, this valve member is a ball having a diameter greater than the inside diameter 316 of the pressure relief disk 314, but less than the inside diameter 319 of the pressure relief seat 318. Thus, the valve member is free to move axially with respect to the pressure relief seat 318, but it is too large to pass through the inside diameter of the pressure relief disk 314.

Preferably, the valve member 330 is a ball, but it may have various geometric configurations. For example, the valve member 330 may be a disk or a tapered plug (not shown). If a tapered plug is used, the smaller tapered end will be position near the pressure relief disk 314 and the larger base end will be adjacent to the inlet check spring 332. The exact configuration will, of course, depend on the dynamic response desired. For example, a solid ball will have a greater mass and thus a slower response time and a lower natural frequency compared to a small light weight disk, or even a hollow metal ball. The valve member may also be constructed of ceramic or engineered plastics, such as polymide.

The valve member 330 is biased away from the closed end 210 of the valve housing 200 by an inlet check spring 332. This spring is seated against the closed end 210 of the valve housing on one end and against the valve member 330 on the other end. Thus, the inlet check spring biases the valve member against the pressure relief disk. When pressure in the high pressure fluid chamber drops below a predetermined minimum, as a result of outward movement of the plunger, the inlet valve opens to permit fluid to enter the high pressure fluid chamber, as shown by the arrows in FIG. 5.

In this way, a valve is formed within the valve housing 200 that functions as both an inlet check valve and a pressure relief valve. The valve member 330 is biased against the inner diameter 314 of the pressure relief disk 314, forming a first seal. The pressure relief disk 314 is biased against the pressure relief seat 318, forming a second seal. Under static conditions, these two seals combine to prevent fluid from passing through the valve housing, and thus they seal the high pressure fluid chamber 180 from the external source of pressurized fluid.

The inlet check function is performed at the first seal. Under typical conditions, the first seal prevents any fluid from entering the high pressure fluid chamber 180. However, if the pressure in the high pressure fluid chamber 180 becomes less than the pressure in the external source of pressurized fluid, a force will be applied on the valve member 330 urging the valve member open, toward the closed end 210 of the valve housing 200. This force is resisted by the inlet check spring 332. If the pressure in the high pressure fluid chamber becomes low enough, the valve member 330 will unseat from the pressure relief disk, opening the first seal. Fluid will then flow from external source, through the inner diameter 316 of the pressure relief disk 314, past the valve member 330, and into the high pressure fluid chamber 180, as shown by the arrows in FIG. 5. Thus the spring force of the inlet check spring dictates the pressured required to allow fluid to flow into the high pressure fluid chamber 180 from the external source.

The pressure relief function is performed at the second seal, between the pressure relief disk 314 and the pressure relief seat 318. Under typical conditions, this seal prevents fluid from exiting the high pressure fluid chamber 180. Hydraulic pressure, applied by the fluid against the outside of the pressure relief disk, and applied by the fluid against the valve member 330 and then from the valve member 330 against the inside of the pressure relief disk 314, urges the pressure relief disk open, away from the pressure relief seat 318. This force is resisted by the pressure relief spring 312. If the pressure from inside the high pressure fluid chamber becomes too great, the pressure relief disk 314 will unseat from the pressure relief seat 319, opening the second seal. Fluid will then flow from the high pressure fluid chamber, through the aperture 216 in the closed end 210 of the valve housing 200, through the space between the outside diameter 315 of the pressure relief disk 314 and the inside diameter 319 of the pressure relief seat 318, and to the external source of pressurized fluid, as shown by the arrows in FIG. 6. Thus, the strength of the pressure relief spring 312 dictates the pressure required in the high pressure fluid chamber that will permit fluid to exit the chamber.

The inlet check spring 332 and pressure relief spring 312 may be constructed of any steel customarily used for such services. The inlet check spring is typically designed for a cracking pressure of several PSI. The pressure relief spring, on the other hand, is typically set for a much higher cracking pressure of about 250 PSI.

This pressure relief valve also has a unique assembly method. First, the pressure relief seat 318, inlet check spring 332, valve member 330, and pressure relief disk are inserted into the valve housing. Then the pressure relief spring 312 is inserted. The spring retainer washer is then inserted, and positioned within the valve housing 200 according to the desired final force on the spring. This final spring force is determined by the desired cracking pressure of the pressure relief valve. The spring retainer washer is then crimped to the valve housing by staking the housing above and below the washer. This method reduces the variation of cracking pressure for the pressure relief valve by reducing the stack up of tolerances. This method also allows for different cracking pressures using the same spring, by adjusting the final load on the spring retainer washer.

In operation, the high pressure fluid chamber is filled with hydraulic fluid. If the power transmission chain is slack, the piston spring will cause the piston to extend. FIG. 3 illustrates one preferred embodiment of the present invention with the piston extended. As the piston extends, the pressure in the high pressure fluid chamber decreases. When this pressure drops to a certain specified level, the inlet check valve will open, allowing fluid from the external source of pressurized fluid to enter the high pressure fluid chamber.

As the tension in the chain 12 increases, the chain applies force on the piston 130 through the lever arm 18. Because the inlet check valve does not permit fluid to exit the high pressure fluid chamber, this force causes an increase in pressure inside the high pressure fluid chamber. When the pressure exceeds a certain specified level, the pressure relief valve opens, and fluid exits the high pressure fluid chamber through the valve housing. This fluid returns through the piston housing aperture 108 to the source of pressurized fluid so that no fluid is lost to the system. The exit of this fluid allows the piston to retract.

Under any condition, the design of the tensioner minimizes the presence of air in the high pressure fluid chamber. As the tensioner draws in fluid from the external source of fluid, the fluid carries with it some trapped air. Because air is compressible, this air allows the high pressure fluid chamber to contract even when no fluid is exiting the chamber. The result is that the tensioner does not exert as much force against the lever arm, and is generally less responsive to changes in chain tension. In addition, after the engine has been turned off, the air separates from the fluid and rises to the highest point in the high pressure fluid chamber. This leads to a particularly unresponsive chain during engine start-up. Thus, a more effective tensioner has a minimum of air in the high pressure fluid chamber.

In the present invention, the volume occupied by the valve housing displaces fluid in the high pressure fluid chamber, reducing the overall volume of the high pressure fluid chamber. Because air is carried in the fluid reducing the volume of fluid in the high pressure fluid chamber necessarily reduces the volume of air in the high pressure fluid chamber. As a result, the performance of the tensioner is improved.

Figure 4:
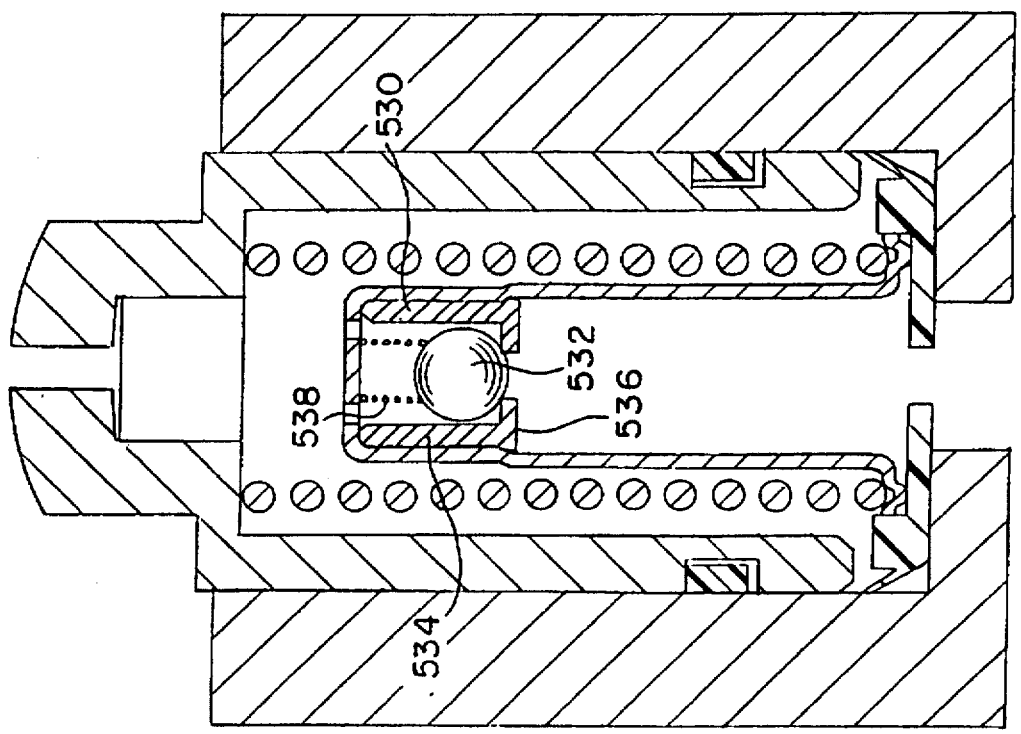
FIG. 4 is a side view of another embodiment of the present invention.
Figure 7:
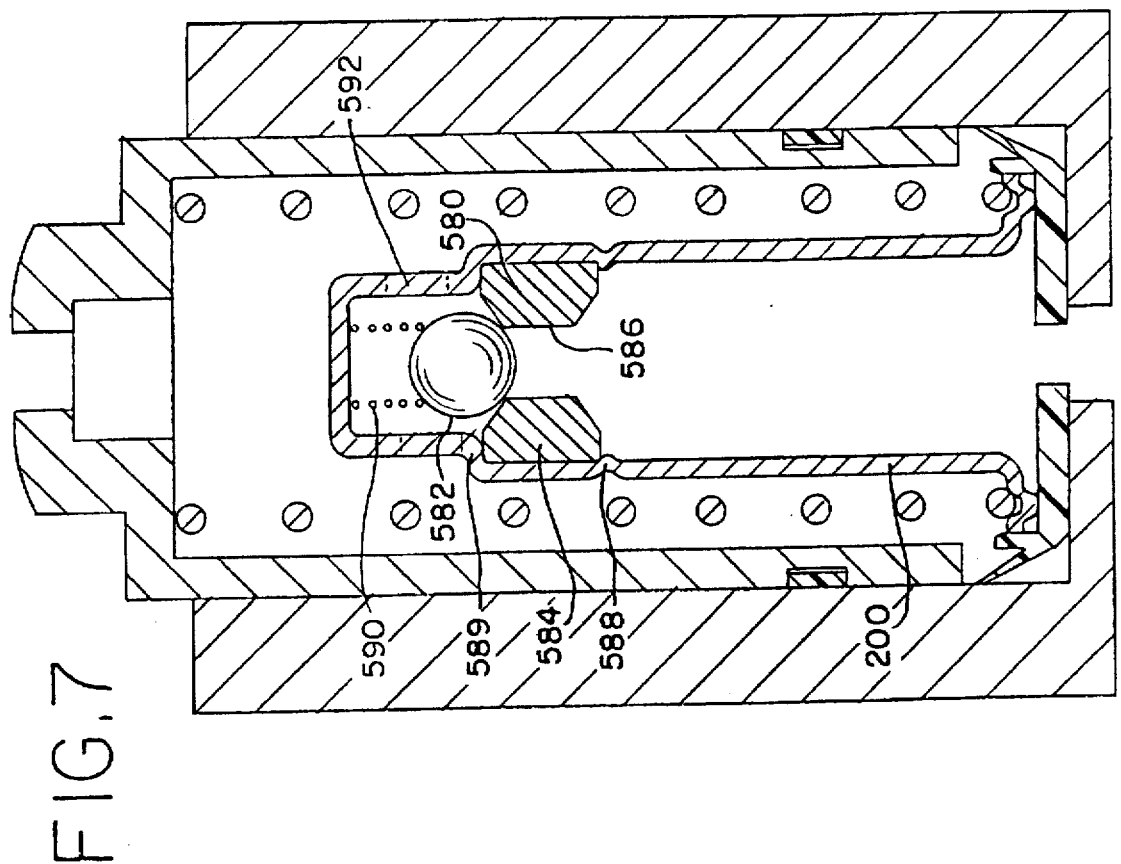
FIG. 7 is a side view of yet another embodiment of the present invention.
Figure 9:
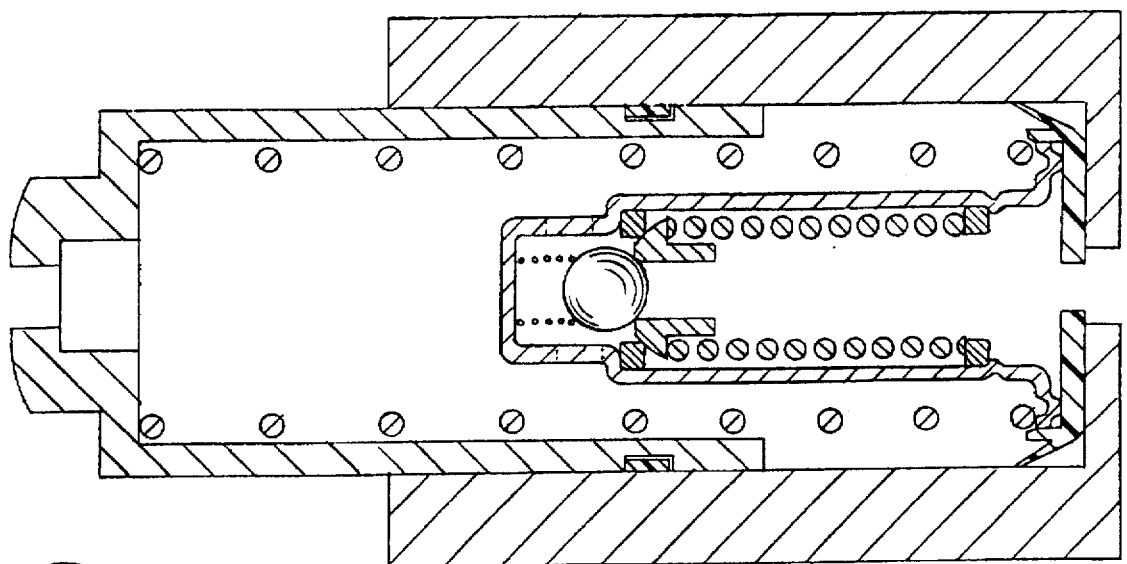
FIG. 9 is a side view of the tensioner shown in FIG. 5, with plunger extended.
Figure 8:
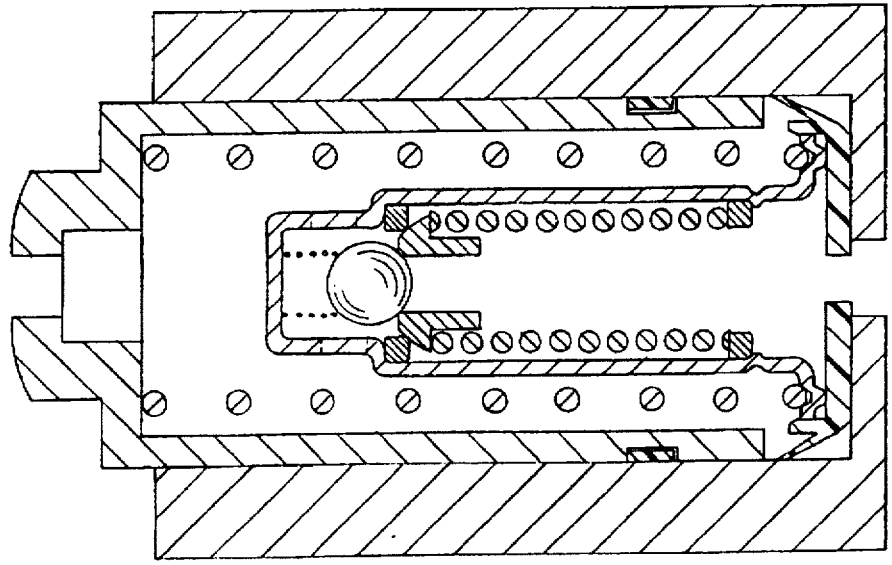
FIG. 8 is a side view of the tensioner shown in FIG. 5, with plunger retracted.

FIGS. 4 and 7 illustrate embodiments of the present invention each having a volume reducing valve housing, but having only an inlet check valve, rather than an integral inlet check and pressure relief valve. In the embodiment shown in FIG. 4, the basic design is the same as in FIGS. 2 and 3, except that the pressure relief valve components are not present. Instead, an inlet check seat 530 has a cylindrical body 534 and a flange 536 extending radially inward at the end of the inlet check seat adjacent to a valve member. The flange 536 has an inner diameter greater than the outer diameter of the valve member 532, which is preferably a ball. The inlet check spring 538 biases the valve member against the flange 536, forming a seal. The seal opens when the hydraulic force on the ball, resulting from the pressure differential between the external source of fluid and the high pressure fluid chamber 180 reaches a certain specified level.

In the embodiment shown in FIG. 7, the basic design is similar to the embodiments shown in FIGS. 5 and 6, but the pressure relief components are not present. An inlet check seat 580 is axially fixed within the valve housing 200. This positioning of the check seat 580 may be achieved, for instance, by seating the check seat 580 against a shoulder 589 of the valve housing, and/or a crimp 588 in the valve housing. The check seat has an inner diameter 586 smaller than the width of the a valve member 582, which is preferably a ball. The inlet check spring 590 biases the valve member 582 against the check seat 580, forming a seal. The seal opens when the hydraulic force on the valve member, resulting from the pressure differential between the external source of fluid and the high pressure chamber 180 reaches a certain specified level.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A hydraulic tensioner for a wrapped power transmission device between rotating members comprising:

a housing having a bore, said bore having an inner surface;

said housing having an aperture in communication with a source of pressurized fluid;

a hollow piston slidably received within said bore, said piston having an inner surface and an outer surface;

a piston spring biasing said piston in a direction toward said power transmission device;

a valve housing comprising a hollow structure having an inner chamber, said valve housing having a plurality of valve housing apertures;

a fluid filled pressure chamber of annular shape, said pressure chamber having an outer surface defined by said piston inner surface and said bore inner surface, said chamber having an inner surface defined by said valve housing;

said valve housing having a first valve housing aperture connecting said inner chamber of said valve housing and said pressure chamber, such that fluid may flow between said inner chamber and said pressure chamber; and said valve housing having a second valve housing aperture arranged adjacent to and connected with said first housing aperture, said second valve housing aperture connecting said inner chamber of said valve housing and said source of pressurized fluid such that fluid may flow between said inner chamber and said source of pressurized fluid.

2. The hydraulic tensioner of claim 1, wherein said valve housing comprises:

a hollow structure having a closed end and an open end;

said hollow structure having a longitudinal axis extending from said closed end to said open end;

said hollow structure having at least one valve housing aperture through which fluid may flow;

a plurality of valves assembled within said hollow structure; and said valves being positioned to regulate the flow of fluid through said hollow structure.

3. The hydraulic tensioner of claim 2, wherein said valves include an integral inlet and pressure relief valve;

said integral inlet and pressure relief valve positioned to allow the transfer of pressurized fluid from said source of pressurized fluid to said pressure chamber; and said integral inlet and pressure relief valve positioned to permit transfer of said fluid from said pressure chamber to said source of pressurized fluid, but to only permit the transfer of fluid from said pressure chamber to said source of pressurized fluid when the pressure of the fluid said pressure chamber reaches a certain specified level.

4. The hydraulic tensioner of claim 3, wherein said integral inlet and pressure relief valve comprises:

a valve member longitudinally translatable within said valve housing;

a first valve seat;

a first valve spring biasing said first valve member against said first valve seat and in the longitudinal direction away from said pressure chamber;

a second valve seat; and a second valve spring biasing said first valve seat against said second valve seat and longitudinally toward said pressure chamber.

5. The hydraulic tensioner of claim 4, wherein said integral inlet and pressure relief valve comprises:

a valve member longitudinally translatable within said valve housing;

a first valve seat;

a first valve spring biasing said valve member against said first valve seat and in the longitudinal direction away from said pressure chamber;

a second valve seat;

a second valve spring biasing said first valve seat against said second valve seat and longitudinally toward said pressure chamber;

a retaining member longitudinally fixed within said valve housing; and said second valve spring being seated against said retaining member.

6. The hydraulic tensioner of claim 5, wherein said retaining member is fixed with respect to said valve housing by means of crimps in said valve housing.

7. The hydraulic tensioner of claim 5, wherein said valve member is a ball.

8. The hydraulic tensioner of claim 4, wherein said valve member is a ball.

9. The hydraulic tensioner of claim 4, wherein said first valve seat has a first sealing surface shaped to form a seal against said valve member, and a second sealing surface shaped to form a seal against said second valve seat.

10. The hydraulic tensioner of claim 2, wherein:

said valves include an inlet check valve;

said inlet check valve positioned to allow the transfer of pressurized fluid from said source of pressurized fluid to said pressure chamber; and said integral inlet and pressure relief valve positioned to block transfer of said fluid from said pressure chamber to said source of pressurized fluid.

11. The hydraulic tensioner of claim 10, wherein said inlet check valve comprises:

a first valve member longitudinally translatable within said valve housing;

a first valve seat longitudinally fixed with respect to said valve housing; and a first valve spring biasing said first valve member against said first valve seat and in the longitudinal direction away from said pressure chamber.

12. The hydraulic tensioner of claim 11, wherein said valve member is a ball.

13. The hydraulic tensioner of claim 1, wherein said valve housing is cylindrical in shape.

14. The hydraulic tensioner of claim 1, wherein said piston is cylindrical in shape.

15. The hydraulic tensioner of claim 14, wherein said first valve seat is annular shaped, having an inner diameter greater than the width of said valve member, and having an outer diameter greater than the inner diameter of said second valve seat.

16. The hydraulic tensioner of claim 1, wherein said piston has a closed end, and a channel in said closed end extending from the inner surface of the piston to the exterior surface of the piston, said channel serving as an air vent.

17. A method of manufacture of a hydraulic tensioner, said tensioner including a housing with a bore, a hollow piston slidably received within said bore, to define a fluid chamber, a first spring biasing said piston against said housing in a protruding direction, a valve housing positioned within said fluid chamber, and a spring biased check valve including a valve member, a first biasing spring, a first seat, a second biasing spring, and second seat, and a spring retaining member, said method comprising:

selecting a first minimum pressure in said fluid chamber at which said inlet check valve will open;

selecting a translatable first valve member, a first spring, and a first valve seat to permit fluid flow through said first valve seat at said first minimum pressure;

selecting a first maximum pressure in said fluid chamber at which to permit fluid flow through said pressure relief valve, said pressure relief valve including a second valve seat and a second spring, said first valve being biased against said second valve seat by a second spring, said second valve seat and said second spring permitting fluid to flow out of said fluid chamber through said second valve seat a fluid pressure in said fluid chamber exceeding said first maximum pressure;

assembling said valve within said valve housing; and arranging said valve housing within said fluid chamber such that said valve housing displaces fluid in said fluid chamber.

18. A method of manufacture of a hydraulic tensioner, said tensioner including an integral inlet and pressure relief valve housed in a hollow structure, said integral inlet and pressure relief valve comprising an inlet check spring, an inlet check valve member, spring retainer washer, a pressure relief spring seated against said washer, a pressure relief disk adjacent to said pressure relief disk, and a pressure relief seat fixed in relation to said hollow structure, said method comprising:

selecting a certain amount of pressure at which said pressure relief valve should open;

calculating the force required to exert such pressure over the face of said disk;

selecting a length to which said spring must be compressed to achieve said force;

inserting said pressure relief seat into said hollow structure;

inserting said inlet check spring into said hollow structure such that said inlet check spring has a first end longitudinally fixed with respect to said valve housing;

inserting said inlet check valve member into said hollow structure such that said inlet check spring biases said inlet check valve member in the direction away from the closed end of said hollow structure;

inserting said pressure relief disk into said hollow structure such that said disk is slidably positioned adjacent to said pressure relief seat;

inserting said pressure relief spring into said hollow structure such that said pressure relief spring is positioned adjacent to said pressure relief disk;

inserting said spring retainer washer into said hollow structure such that said spring retainer washer is in contact with said pressure relief spring, and such that said pressure relief spring is compressed to said length; and positioning said spring retainer washer such that its longitudinal location in said hollow structure is fixed.

19. The method of manufacture of claim 18, wherein said positioning of said spring retaining washer is achieved by crimping said hollow structure on both sides of said spring retaining washer.

* * * * *